United States Patent
Brinks et al.

(10) Patent No.: US 8,331,639 B2
(45) Date of Patent: Dec. 11, 2012

(54) RADIOLOGICAL IMAGING INCORPORATING LOCAL MOTION MONITORING, CORRECTION, AND ASSESSMENT

(75) Inventors: Ralph Brinks, Hagen (DE); Alexander Fischer, Aachen (DE); Ana Belen Martin Recuero, Aachen (DE); Jens-Christoph Georgi, Aachen (DE); Bernd Schweizer, Herzogenrath (DE); Timo Markus Paulus, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 230 days.

(21) Appl. No.: 12/996,781

(22) PCT Filed: Jun. 1, 2009

(86) PCT No.: PCT/IB2009/052297
§ 371 (c)(1),
(2), (4) Date: Dec. 8, 2010

(87) PCT Pub. No.: WO2009/153683
PCT Pub. Date: Dec. 23, 2009

(65) Prior Publication Data
US 2011/0081068 A1   Apr. 7, 2011

Related U.S. Application Data

(60) Provisional application No. 61/073,381, filed on Jun. 18, 2008.

(51) Int. Cl.
*G06K 9/00* (2006.01)

(52) U.S. Cl. .............................. 382/128; 128/922; 378/4

(58) Field of Classification Search ................... 382/100, 382/128, 129, 130, 131, 132; 128/922; 378/4–27
See application file for complete search history.

(56) References Cited

U.S. PATENT DOCUMENTS

| | | | | |
|---|---|---|---|---|
| 5,553,113 | A | * | 9/1996 | Weedon ........................ 378/98.5 |
| 5,758,645 | A | * | 6/1998 | Qian ............................. 600/425 |
| 7,117,026 | B2 | | 10/2006 | Shao et al. |
| 7,574,249 | B2 | * | 8/2009 | Piacsek et al. ................. 600/425 |
| 8,144,962 | B2 | * | 3/2012 | Busch et al. ................... 382/131 |

(Continued)

FOREIGN PATENT DOCUMENTS

WO   2007100955 A2   9/2007

OTHER PUBLICATIONS

Bundschuh, R. A., et al.; Postacquisition Detection of Tumor Motion in the Lung and Upper Abdomen Using List-Mode PET Data: A Feasibility Study; 2007; J. of Nuclear Medicine; 48(5)758-763.

(Continued)

Primary Examiner — Anand Bhatnagar (57) ABSTRACT

A radiological imaging method comprises: acquiring radiological lines of response (LOR's) from a subject; grouping the acquired LOR's into time intervals such that each group of LOR's (20) was acquired during a selected time interval; identifying a region of interest (60, 74) for each time interval based on LOR's grouped into that time interval; for each time interval, determining a positional characteristic (102) of the region of interest identified for that time interval based on LOR's grouped into that time interval; for each time interval, spatially adjusting LOR's grouped into that time interval based on the positional characteristic of the region of interest identified for that time interval; and reconstructing at least the spatially adjusted LOR's to generate a motion compensated reconstructed image.

25 Claims, 8 Drawing Sheets

U.S. PATENT DOCUMENTS

| | | | |
|---|---|---|---|
| 2002/0176535 A1* | 11/2002 | Dixon et al. | 378/62 |
| 2004/0167395 A1* | 8/2004 | Behrenbruch et al. | 600/420 |
| 2006/0002632 A1 | 1/2006 | Fu et al. | |
| 2008/0039713 A1* | 2/2008 | Thomson et al. | 600/411 |
| 2011/0081068 A1* | 4/2011 | Brinks et al. | 382/132 |

OTHER PUBLICATIONS

Cerqueira et al., "Standardized Myocardial Segmentation and Nomenclature for Tomographic Imaging of the Heart," American Heart Association, Inc., pp. 539-542 (2002).

Grotus, N., et al.; Fully 4D Reconstruction Applied to Respiratory Gated PET Acquisitions; 2007; IEEE Nuclear Science Symposium Conf Record; pp. 4401-4405.

Klein et al., "Fine-Scale Motion Detection Using Intrinsic List Mode PET Information," Mathematical Methods in Biomedical Image Analysis, MMBIA, IEEE Workshop, pp. 71-78 (2001).

Lamare et al., "List-mode-based reconstruction for respiratory motion correction in PET using non-rigid body transformations," Phy.Med.Biol 52, pp. 5187-5204 (2007).

Qiao et al., "Region of interest motion compensation for PET image reconstruction," Phys.Med.Biol. 52, pp. 2675-2689 (2007).

Qiao et al., "A motion-incorporated reconstruction method for gated PET studies," Phy.Med.biol 51, pp. 3769-3783 (2006).

Rahmim, "Advanced Motion correction Methods in PET," Iran J Nucl Med, vol. 13, No. 24, pp. 1-17 (2005).

Seppenwoolde, Y., et al.; Precise and real-time measurement of 3D tumor motion in lung due to breathing and heartbeat, measured during radiotherapy; 2002; Int'l. J. of Radiation Oncology Biology Physics; 53(4)822-834.

Thorndyke, B., Reducing respiratory motion artifacts in positron emission tomography through retrospective stacking; 2006; Med. Phys.; 33(7)2632-2641.

* cited by examiner

RADIOLOGICAL IMAGING INCORPORATING LOCAL MOTION MONITORING, CORRECTION, AND ASSESSMENT

CROSS REFERENCE TO RELATED APPLICATIONS

This application claims the benefit of U.S. provisional application Ser. No. 61/073,381 filed Jun. 18, 2008, which is incorporated herein by reference.

The following relates to the imaging arts, medical arts, and related arts. It is described herein with illustrative reference to positron emission tomography (PET) imaging, but will find more general application in radiological imaging generally, for example PET, single photon emission computed tomography (SPECT), or so forth, and in medical techniques employing such radiological imaging such as elasticity analyses, radiotherapy monitored by radiological imaging, and so forth.

Imaging techniques such as PET and SPECT entail acquisition of lines of response (LOR's) that can be related to radiopharmaceutical emissions. In PET, the radiopharmaceutical emits positrons that are rapidly annihilated in electron-positron annihilation events, each of which results in the emission of two oppositely directed 511 keV gamma rays. Radiation detectors surrounding the subject detect substantially simultaneous 511 keV gamma ray events, and each substantially simultaneous pair of 511 keV detection events defines a LOR between the detections. It is known that (neglecting scattering or other artifacts) the sourcing electron-positron annihilation event was located somewhere along the LOR. In a variant technique known as time-of-flight PET (TOF-PET), the small time difference (or lack thereof) between the two substantially simultaneous 511 keV gamma ray detection events is used to further localize the sourcing electron-positron annihilation event along the LOR.

In SPECT, the radiation emission events of radiopharmaceuticals emit a single photon or particle per event (or, possibly, may emit multiple photons or particles but not oppositely oriented as in PET). To define a LOR based on a single photon or particle detection event, the detectors used in SPECT include collimators that limit the view of each detector to a line-of-sight or small-angle conical view. In some embodiments, a gamma camera is used to acquire SPECT data. Such a gamma camera typically includes one, two, three, or more detector "heads" each including a two-dimensional array of detectors, and further includes actuators, robotic arms, a gantry, or other mechanisms to enable the detector heads to move around the subject, optionally conformally, in order to acquire views over a linear or solid angular span.

The PET, SPECT, or other LOR data can be thought of a "raw" data. In some approaches, the LOR data are stored as "list mode" data in which each LOR is stored as spatial coordinates (suitably represented, for example, by two points in space intersected by the LOR, or by a single point intersected by the LOR and a unit directional vector, or so forth) and a temporal coordinate, that is, the time of occurrence of the LOR. For TOF-PET data, TOF information is also stored, for example in the form of a most likely location of the positron-electron annihilation event along the LOR, or in the form of a most likely location of the event along the LOR together with a variance, standard deviation, or other statistical measure indicative of the uncertainty or confidence interval of the event localization along the LOR, or as the two substantially simultaneous detection events each stored with their respective time-of-occurrence, or so forth. The list mode data is reconstructed to form a reconstructed image, for example using filtered backprojection, iterative backprojection, or another reconstruction algorithm.

Radiological imaging is performed over a data acquisition period spanning a few seconds, several minutes, several tens of minutes, or longer. A consequence of the extended acquisition period is that the subject may move during acquisition. Such motion may be stochastic, for example a "random" twitch or shift of a medical patient during imaging, or may be periodic, quasi-periodic, or generally repetitive, such as occurs due to cardiac or respiratory cycling. If left unaddressed, such motion can result in image blurring or other artifacts in the reconstructed image.

Subject motion has been addressed in the past by various techniques. In cardiac or respiratory gating, the cardiac or respiratory cycle is monitored and only LOR's acquired during a portion (preferably a quiescent portion) of the cycle are used for generating the reconstructed image. Such gating techniques are of limited applicability—they cannot, for example, correct for stochastic motion. Even within the limited areas where gating is applicable, gating techniques can fail to account for factors such as a gradually changing cardiac or respiratory cycle.

Other approaches for addressing subject motion entail post-acquisition image processing. In these approaches, LOR's acquired over small time intervals are reconstructed to produce time-limited "snapshots" of the subject each covering intervals that are (hopefully) short enough to avoid substantial subject motion. Optionally, the "snapshot" images can be spatially registered and combined in image space to produce a composite motion-compensated image. However, depending upon the rate of LOR generation, the amount of LOR data from which each "snapshot" image is reconstructed may be undesirably small. The registration process is performed in the spatial domain, and can also introduce artifacts.

Another technique for local motion compensation is described in Busch et al., WO 2007/100955. This technique applies motion correction or compensation at the LOR level, prior to image reconstruction. LOR's intersecting a two- or three-dimensional spatial region of interest are identified and grouped into time intervals. For each time interval, a positional characteristic of the region of interest is identified. The positional characteristic can for example be identified by performing an approximate reconstruction using unfiltered backprojection or another fast algorithm and identifying a center-of-mass of intensity of the approximate image. In another approach, the positional characteristic is derived directly from the LOR's based on a vector analysis technique also disclosed in WO 2007/100955. The change or shift of the positional characteristic over time intervals is a measure of the local motion in the region of interest. To perform motion compensation, the LOR's are corrected or compensated for this local motion, and the corrected LOR's are reconstructed to produce a motion compensated image. Advantageously, this approach does not entail post-reconstruction spatial image registration, and the set of LOR's corresponding to each time interval do not need to be sufficiently large in number to enable a high resolution image reconstruction.

The following provides new and improved apparatuses and methods which improve on local motion compensation techniques such as those disclosed in WO 2007/100955, and that employ local motion detection techniques such as those disclosed in WO 2007/100955 to generate additional useful information based on radiological imaging data.

In accordance with one disclosed aspect, a radiological imaging method is disclosed, comprising: acquiring radiological lines of response (LOR's) from a subject; grouping the acquired LOR's into time intervals such that the LOR's of a group of LOR's were acquired during a selected time interval; for at least some time intervals, identifying a region of interest for the time interval based on LOR's grouped into the time interval, determining a positional characteristic of the region of interest identified for the time interval based on LOR's grouped into the time interval, and spatially adjusting LOR's grouped into the time interval based on the positional characteristic of the region of interest identified for the time interval; and reconstructing at least the spatially adjusted LOR's to generate a motion compensated reconstructed image.

In accordance with another disclosed aspect, a radiological imaging system is disclosed, which is configured to perform the method recited in the preceding paragraph.

In accordance with another disclosed aspect, a radiological imaging method is disclosed, comprising: acquiring radiological lines of response (LOR's) from a subject; grouping the acquired LOR's into time intervals such that the LOR's of a group of LOR's were acquired during a selected time interval; for at least some time intervals, determining a positional characteristic of a region of interest based on LOR's grouped into the time interval and spatially adjusting LOR's grouped into the time interval based on the positional characteristic identified for the time interval; reconstructing at least the spatially adjusted LOR's to generate a motion compensated reconstructed image; and assessing the positional characteristics determined for the time intervals.

In accordance with another disclosed aspect, a radiological imaging method is disclosed, comprising: acquiring radiological lines of response (LOR's) from a subject; grouping the acquired LOR's into time intervals such that the LOR's of a group of LOR's were acquired during a selected time interval; for at least some time intervals (i) generating a low resolution reconstructed image of a region of interest from the LOR's grouped into the time interval, (ii) determining a center of mass positional characteristic by cross-correlating the low resolution reconstructed image and a template, and (iii) spatially adjusting LOR's grouped into the time interval based on the positional characteristic; and reconstructing at least the spatially adjusted LOR's to generate a motion compensated reconstructed image.

In accordance with another disclosed aspect, a radiological imaging method is disclosed, comprising: acquiring radiological lines of response (LOR's) from a subject; grouping the acquired LOR's into time intervals such that the LOR's of a group of LOR's were acquired during a selected time interval; for at least some time intervals (i) generating a low resolution reconstructed image of a region of interest from the LOR's grouped into the time interval, (ii) segmenting the low resolution reconstructed image to define a plurality of regions of interest, (iii) determining a positional characteristic for each region of interest, and (iv) spatially adjusting LOR's grouped into the time interval based on the determined positional characteristics; and reconstructing at least the spatially adjusted LOR's to generate a motion compensated reconstructed image.

One advantage resides in providing improved local motion compensation.

Another advantage resides in providing improved local motion estimation.

Another advantage resides in providing feedback as to the quality of local motion estimation or local motion compensation.

Another advantage resides in providing additional useful information based on local motion estimation performed during radiological imaging.

Still further advantages will be apparent to those of ordinary skill in the art upon reading and understand the following detailed description.

Figure 1:
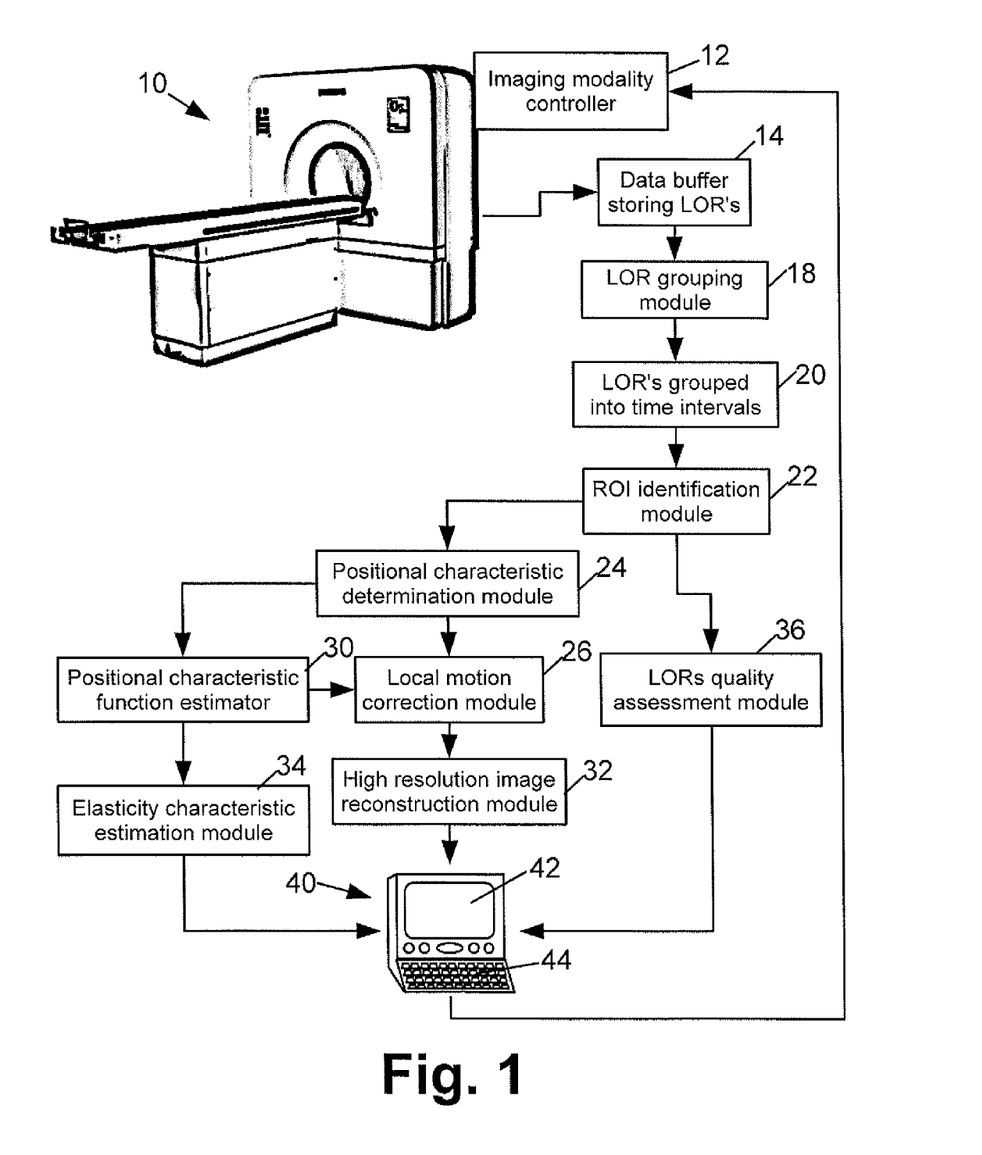
FIG. 1 diagrammatically shows a radiological imaging system including components for local motion monitoring, correction, and assessment.

With reference to FIG. 1, a radiological imager 10 such as an illustrated positron emission tomography (PET) scanner, or a single photon emission computed tomography (SPECT) imager such as a gamma camera, or so forth is employed to image a human patient, laboratory animal, or other subject (not illustrated). The radiological imager 10 can, for example, comprise a commercial radiological imager available from Koninklijke Philips Electronics N.V., Eindhoven, The Netherlands such as a Gemini PET scanner, a Forte or Skylight gamma camera, a Precedence SPECT/computed tomography (SPECT/CT) multimodality imager, or so forth. Commercial radiological scanners from other suppliers, or non-commercial radiological scanners, are also suitable.

The imager 10 operates under the control of an imaging modality controller 12, and generates LOR data including timestamping data that are stored in a suitable memory or buffer 14. In some embodiments suitable for PET LOR storage, the PET LOR data are stored in a listmode as spatial coordinates of two substantially simultaneous 511 keV detection events along with a time of occurrence of the two substantially simultaneous 511 keV detection events. For time-of-flight PET (TOF-PET), the temporal information is suitably stored as a time value for each of the two substantially simultaneous 511 keV detection events. For SPECT data, suitable a storage format may entail storing the spatial coordinates of the detection event along with the time. The direction can be derived based on the known collimation of the detector at the stored spatial coordinates, or may be computed and explicitly stored. These are merely illustrative examples, and in general the LOR data can be stored in the buffer 14 in any format that represents or enables derivation of the line-of-response and the corresponding temporal information (optionally including TOF temporal information).

The LOR data is processed prior to high resolution image reconstruction so as to compensate for motion, using a LOR-level compensation technique such as those disclosed in Busch et al., WO 2007/100955, which is incorporated herein by reference in its entirety. A LOR grouping module 18 groups the acquired LOR's into time intervals such that each group of LOR's was acquired during a selected time interval. Each time interval is either: (i) a contiguous time interval of sufficiently short duration such that any motion occurring in the time interval should be small; or (ii) an aggregation of a plurality of non-contiguous time sub-intervals each of sufficiently short duration such that any motion occurring in the time sub-interval should be small and with the aggregated time sub-intervals having a common cardiac or respiratory phase as indicated by cardiac or respiratory monitoring. The output of the LOR grouping module 18 are LORs grouped into time intervals 20, with the LORs of each time interval suitably treated as having a substantially quiescent motion state.

A region-of-interest (ROI) identification module 22 determines a sub-set of the LORs of each time interval that intersect with or, more generally, contribute to image content within, a spatial (two- or three-dimensional) region-of-interest (ROI). In some embodiments, the ROI is fixed within the imaging plane or imaging volume and is the same for every time interval. In other embodiments, the ROI is identified for each time interval based on a motion estimate, motion model, or other information, and the identified ROI is generally different for different time intervals. By "generally different" it is to be understood that the ROI for different time intervals is generally different since the ROI is identified in a different identification operation for each time interval, but that in some instances the different identification operations may result in identification of the same or similar ROI for two or more different time intervals.

More generally, since the motion compensation processing occurs in LOR space, what is of interest is identification of which LORs in each time interval grouping pass through or otherwise contribute to image content within the identified ROI. In some embodiments, any LOR that intersects or passes through the identified ROI is considered to contribute to image content within the ROI. In other embodiments, the extent of overlap between the LOR and the ROI may be considered. For example, in one suitable criterion only LORs that overlap the ROI for at least a threshold length are considered to contribute to image content within the ROI. For TOF-PET data, the temporal information is preferably also considered in identifying LOR's that contribute to image content in the ROI. For example, in one suitable criterion only LOR's whose electron-hole annihilation event probability peak lies within the ROI are considered to contribute to image content in the ROI. In another suitable criterion, only LOR's whose electron-hole annihilation event probability distribution along the LOR overlaps the ROI with greater than a threshold overlap are considered to contribute to image content in the ROI.

With the ROI identified for each time interval, a positional characteristic determination module 24 processes the LORs identified as contributing to image content within the ROI for each time interval so as to determine a positional characteristic of the ROI for that time interval. The positional characteristic may be, for example, a center-of-mass of the image, identified by performing a low-resolution image reconstruction of the LORs contributing to image content within the ROI. The low-resolution image reconstruction may, for example, employ an unfiltered backprojection algorithm. For LOR's including TOF information, the low-resolution image reconstruction can employ an accumulative mapping of the electron-hole annihilation event probability peaks or distributions along the LOR's to generate a density map from which the center-of-mass may be estimated. Other positional characteristics, and other techniques for estimating the positional characteristics, can be employed by the positional characteristic determination module 24 to determine a positional characteristic of the ROI for each time interval. Moreover, it is to be appreciated that one, two, or more ROI may be determined for each time interval. For example, in some embodiments disclosed herein multiple ROI are determined using an anatomical model, with the different ROI of a given time interval corresponding to different anatomical regions or features represented by the anatomical model.

The positional characteristic determined for the ROI of each time interval is a measure of local motion in the ROI. In some embodiments, the local motion is considered for computational simplicity to be a rigid translation within the ROI, although more complex non-rigid, or rotational, or other motions are also contemplated. If multiple ROI are determined for each time interval, then each ROI may in general have a different local motion. It is to be appreciated that in such embodiments different rigid translational local motions of the different ROI in a given time interval may collectively approximate a pulsating expansion or contraction or other non-rigid motion.

A local motion correction or compensation module 26 spatially adjusts the LOR's identified as contributing to image content within the ROI for each time interval so as to compensate for the local motion indicated by the determined positional characteristic. In an illustrative embodiment in which the local motion is considered as a rigid translation, the local motion correction module 26 adjusts the LOR's for the local motion by shifting each LOR by an amount corresponding to the positional characteristic determined for the ROI. If the positional characteristic includes a rotation, then the correction can entail rotating each LOR by the rotation indicated by the positional characteristic.

The adjusted LOR's include at least those LOR's that contribute to image content within the ROI. Optionally, LOR's "outside" of the ROI are also corrected. In some embodiments, all the LOR's of each time interval are adjusted, for example to produce a rigid translation of the LORs in the case of a rigid translational positional characteristic of a single ROI. Alternatively, the adjustment applied outside of the ROI can be "feathered" or otherwise gradually decreased with increasing distance away from the ROI, to produce a smooth adjustment. If multiple ROI are determined for each time interval, then LOR's contributing to a region between two ROI can be adjusted in a continuous fashion to avoid abrupt spatial transitions in the adjustment. If a LOR passes through or otherwise contributes to two different ROI, then the adjustment can be a weighted average or other statistical average of the adjustments applicable in the two ROI.

In yet another approach, the LOR's contributing to image content in each ROI are treated independently, and the LOR's contributing to image content in each ROI are reconstructed after adjustment based on the positional characteristic of that ROI so as to produce one or more images corresponding to the one or more ROI for each time interval. In this approach, a LOR that contributes to image content in two or more ROI is duplicated and included in the set of LOR's for each ROI, and each instance of the LOR is adjusted in accordance with the positional characteristics of the ROI to which it is assigned.

Optionally, a positional characteristic function estimator 30 performs interpolation between the positional characteristics of successive time intervals so as to generate a continuous positional characteristic-time function. With such a function, each LOR can be shifted, rotated, or otherwise spatially corrected based on the instantaneous value of the positional characteristic at the time-of-occurrence of that LOR, said instantaneous value being computed using the continuous positional characteristic-time function, so as to provide motion compensation at a more fine temporal resolution than the temporal spacing of successive time intervals.

At least the spatially adjusted LOR's are processed by a high resolution image reconstruction module 32 to generate a motion-compensated reconstructed image. In some embodiments, all the LOR's of a given time interval are reconstructed together by the high resolution image reconstruction module 32 to generate the motion-compensated reconstructed image. In other embodiments, only those LOR's that contribute to image content of a ROI are reconstructed by the high resolution image reconstruction module 32 to generate a motion-compensated reconstructed image of the ROI. If a given time interval includes two or more ROI, then in such an embodiment the LOR's that contribute to image content of each ROI are reconstructed independently to generate two or more motion-compensated reconstructed images corresponding to the two or more ROI. Alternatively, as mentioned earlier the LOR adjustments can be feathered or otherwise smoothed for LOR's contributing to regions adjacent the ROI to provide smoothly adjusted LOR data that are suitably reconstructed as a single data set by the high resolution image reconstruction module 32 to generate a single motion-compensated reconstructed image.

The positional characteristic-time function optionally generated by the optional positional characteristic function estimator 30 is optionally used in other ways. For example, the system of illustrative FIG. 1 includes an elasticity characteristic estimation module 34 that estimates elasticity of the tissue in the ROI based on the positional characteristic-time function, based on the general relationship that displacement is proportional to the applied deformational pressure scaled by an elasticity measure such as the inverse of the stiffness (that is, higher stiffness leads to lower deformation for a given applied deformational pressure).

Optionally, the reliability of the local motion estimate (or of other information derived therefrom, such as elasticity) is estimated to provide a warning or other feedback when the local motion estimate is erroneous or of questionable accuracy. In one suitable approach, a LOR's quality assessment module 36 assesses the number of LOR's grouped into each time interval by the LOR grouping module 18, or assesses the number of such LOR's in each time interval that are identified by the ROI identification module 22 as contributing to image content of the ROI, or assesses another quality measure, and provides a warning or other indication if this number does not satisfy a quality threshold or other quality criterion.

A user interface, such as an illustrated computer 40, includes a display 42 for displaying the high resolution reconstructed image output by the high resolution reconstruction module 32, or for displaying warnings generated by the LOR's quality assessment module 36, or so forth. The illustrated computer 40 also includes one or more input devices such as an illustrated keyboard 44, or a mouse or other pointing-type input device, or so forth to enable a radiologist or other user to formulate instructions, imaging sequences, or other control input delivered to the imaging modality controller 12 to implement desired imaging sequences. Alternatively, a separate control interface can be provided. Moreover, it is to be appreciated that the various components 12, 14, 18, 22, 24, 26, 30, 32, 34, 36, 40 can be variously integrated, combined, or otherwise arranged. For example, the microprocessor and associated software or firmware of the computer 40 can embody one, two, some, or all of the various computational components 12, 18, 22, 24, 26, 30, 32, 34, 36, and these computational components can also be thought of as being embodied by the storage medium that stores the instructions defining the software or firmware, such storage medium being suitably embodied, for example, as one or more of a magnetic disk, an optical disk, an electrostatic memory or storage such as a FLASH memory, a read-only-memory (ROM), random access memory (RAM), an off-site Internet storage unit, or so forth. Similarly, the illustrated LOR memory or buffer 14 or other data memories or buffers (for examples, storing the positional characteristic information, reconstructed images, or so forth) can be embodied as readable-and-writable storage of the computer 40, suitably embodied for example as one or more of a magnetic disk, an optical disk, an electrostatic memory or storage such as a FLASH memory, RAM, an off-site Internet storage unit, or so forth. These are merely illustrative examples, and the various illustrated components can also be embodied by other digital processing components or storage or, in some instances, by suitably configured analog processing components.

Having described an illustrative radiological imaging system with reference to FIG. 1, some further illustrative embodiments of selected components of the illustrative radiological imaging system are next described.

Figure 2:
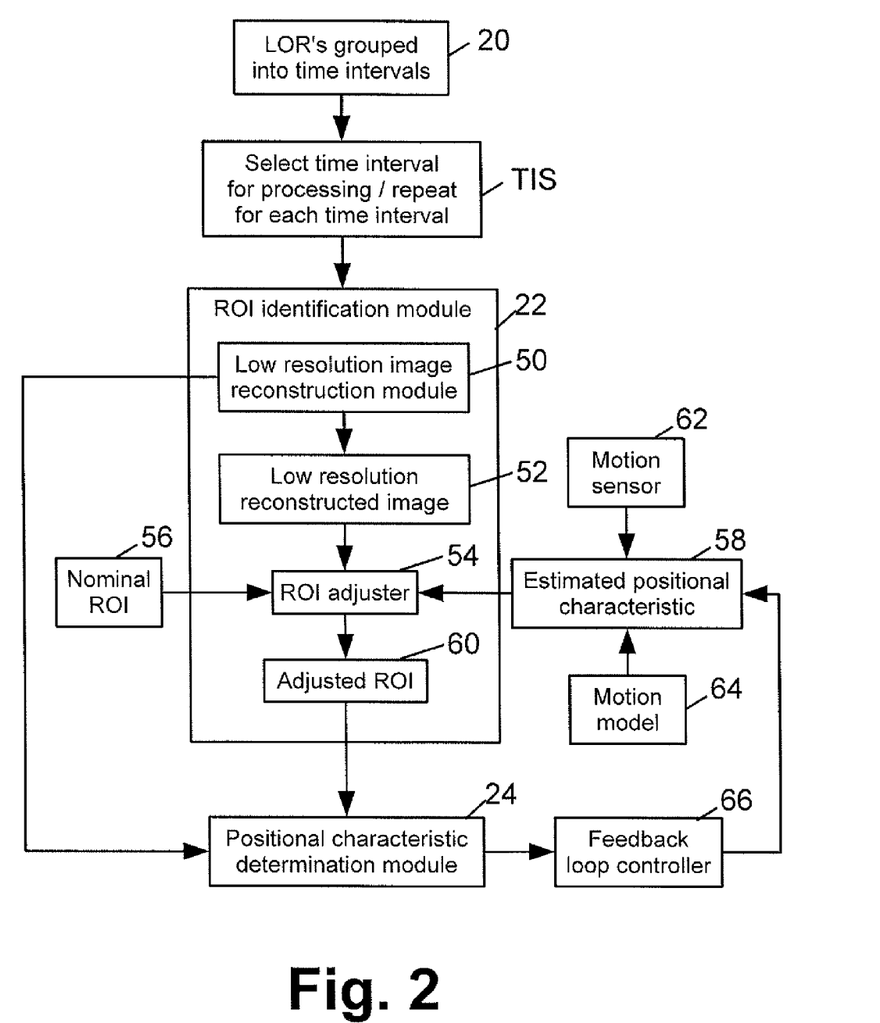
FIG. 2 diagrammatically shows an illustrative embodiment of the region of interest identification module of the system of FIG. 1.

With continuing reference to FIG. 1 and with further reference to FIG. 2, an illustrative embodiment of the ROI identification module 22 is described. A time interval selector TIS selects a time interval for processing by the ROI identification module 22, and repeats the selection for each time interval. The illustrated ROI identification module 22 selects a generally different ROI for each time interval. Advantages of this approach are as follows. Typically, the ROI is related to a lesion or other feature of interest. The radiopharmaceutical may be selected to preferentially collect in lesion tissue, or may be selected to collect in blood with the expectation that a lesion or other abnormality typically has extensive vasculature. Even with such preferential collection, however, the number of LOR's contributing to image content in the ROI image during the (relatively short) time interval has low statistics, resulting in substantial image noise. There is also a considerable background signal present due to radiopharmaceutical that does not collect in the lesion or other feature of interest. The determined center of gravity or other positional characteristic is influenced by both noise in the ROI and background signal from outside the ROI, and both influences can produce error in the determined positional characteristic. Because both noise and background are generally movement-independent, the result is typically an underestimate of the translational motion.

FIG. 2 illustrates principal internal components of the ROI identification module 22 which addresses these issues by moving the ROI with the estimated motion. A low resolution image reconstruction module 50 employs an unfiltered backprojection algorithm, or (for TOF) accumulative mapping of the electron-hole annihilation event probability peaks or distributions along the LOR's, or another fast reconstruction algorithm to generate a low resolution reconstructed image 52. A ROI adjuster 54 adjusts a nominal ROI 56 based on an estimated positional characteristic 58 to generate an adjusted ROI 60. The estimated positional characteristic 58 can be obtained from various sources, such as a motion sensor 62 that provides a signal indicative of motion of the ROI, possibly employed in conjunction with a motion model 64. For example, the motion sensor 62 may be an electrocardiograph or respiratory sensor providing information on the cardiac or respiratory cycling, and the motion model 64 may be a model of lesion motion as a function of cardiac or repiratory state derived from imaging by a fast modality such as CT or MR.

Alternatively, an iterative approach can be used to generate the estimated positional characteristic 58. In this approach, the estimated positional characteristic 58 is initialized as a null value, so that the initial adjusted ROI 60 equals the nominal ROI 56. This is repeated for all time intervals, so that every time interval initially has the nominal ROI 56. The positional characteristic determination module 24 is then applied to determine the positional characteristic for each time interval, albeit with some possible error due to the use of the unadjusted or nominal ROI 56. A feedback loop controller 66 then feeds back these positional characteristics as the estimated positional characteristics 58 for a second iteration of ROI identification performed by the ROI identification module 22, so as to produce adjusted ROI 60 that are adjusted from the nominal ROI 56 based on the updated estimated positional characteristics 58. These new adjusted ROI 60 are input to the positional characteristic determination module 24 to determine improved positional characteristics using the improved adjusted ROI 60. Optionally, the feedback loop controller 66 can again feed back these improved positional characteristics to further iteratively improve the adjusted ROI 60 and so forth until the positional characteristics from one iteration to the next change by less than an amount less than a stopping criterion.

The reason why using the adjusted ROI 60 provides a better estimate of the positional characteristic is as follows. The underlying anatomy moves in a more or less uncompressed way, that is, with limited stretching and squashing, for most ROI of size a few centimeters or less in a human-sized body. By moving the ROI used in determining the positional characteristic with the motion of the lesion or other feature of interest, it is expected that the underlying image content does not change with movement of the lesion or other feature of interest. In other words, the image content of the ROI (and hence the noise) and the image content surrounding the ROI (and hence the background signal) do not change in a substantial manner with changing positional characteristic. It should be noted that the estimated positional characteristic 58 can be less than identical with the positional characteristic output by the positional characteristic determination module 24, since even a rough estimate of the true anatomy motion provides substantial advantage in removing contextual and noise variation from the analysis.

As already noted, the estimated positional characteristic 58 can be obtained in various ways. The illustrated motion model 64 is typically selected to model motion types that are more or less harmonic motions, such as breathing or cardiac motion. The motion model 64 is used to predict the motion of the ROI approximately. The motion model can be used in an open loop fashion or, more preferably, is employed in conjunction with a sensor such as a breathing sensor, electrocardiograph, or so forth to detect the phase of the harmonic breathing or heart motion. This measured motion phase can be linked to the motion model 64 to predict a motion vector for the analysis ROI. In approaches implemented by the feedback loop controller 66, a motion estimate or other positional characteristic for a preceding time interval or intervals already derived by the positional characteristic determination module 24 can be used to extrapolate the estimated positional characteristic 58 for the time interval under current processing by the ROI identification module 22. Optionally, this approach can be carried further using an iterative approach as already described.

Figure 3:
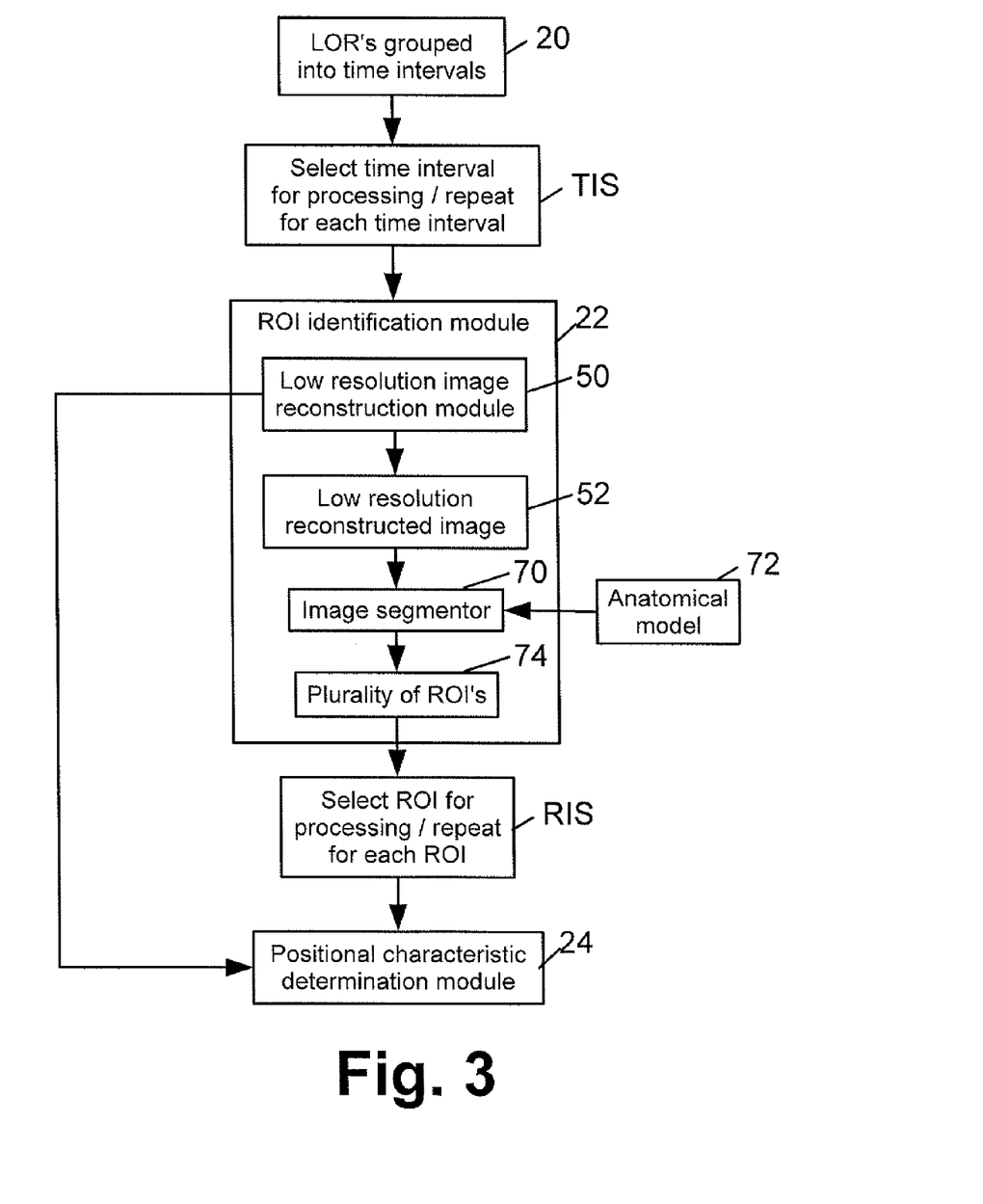
FIG. 3 diagrammatically shows another illustrative embodiment of the region of interest identification module of the system of FIG. 1.
Figure 4:
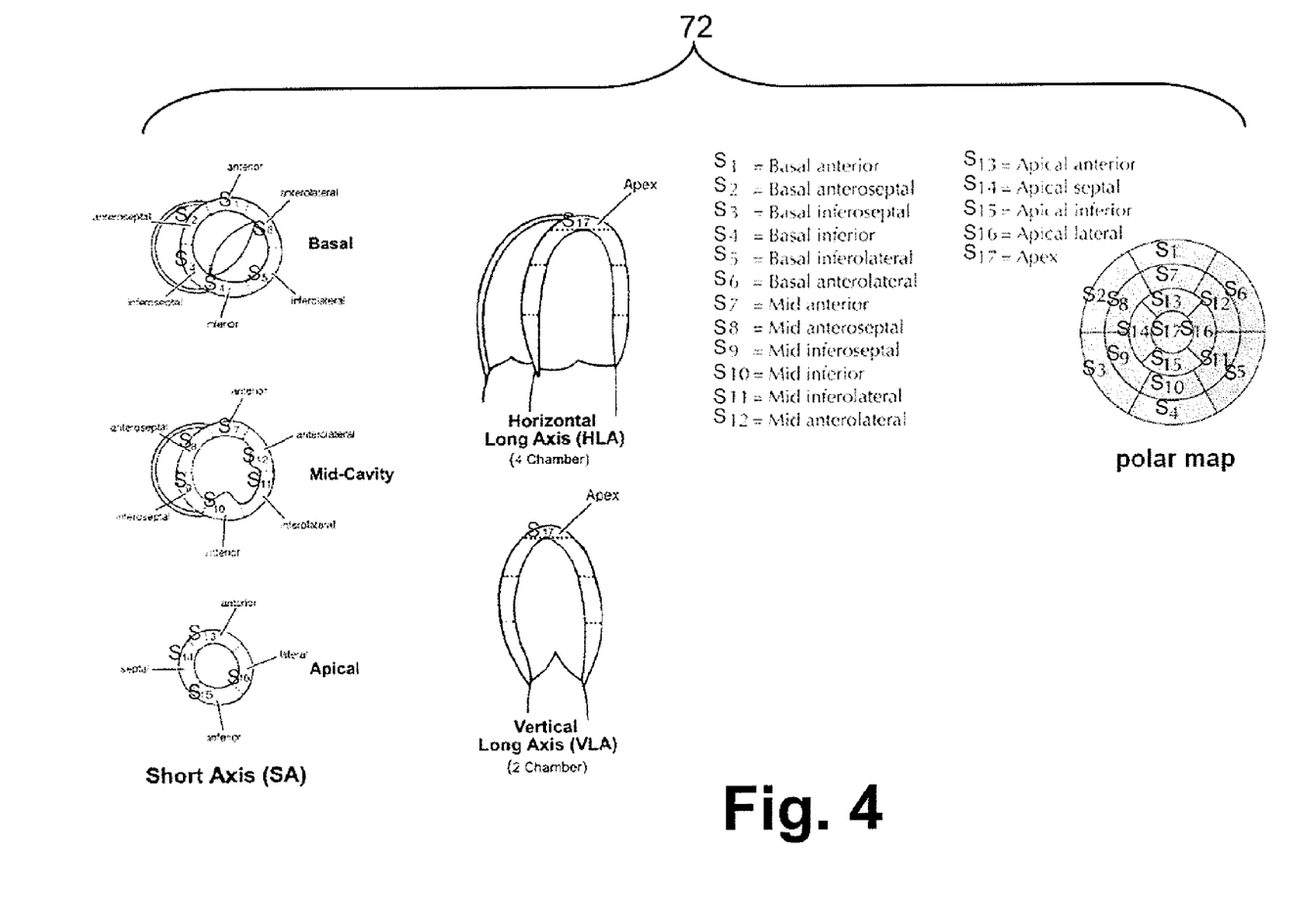
FIG. 4 diagrammatically shows a cardiac deformable mesh model suitably used in the illustrative embodiment of the region of interest identification module of FIG. 3.

With continuing reference to FIG. 1 and with further reference to FIGS. 3 and 4, another illustrative embodiment of the ROI identification module 22 is described. This approach also uses the time interval selector TIS to apply the ROI identification module 22 on a per-time interval basis, and selects a generally different ROI for each time interval. This approach also uses the low resolution image reconstruction module 50 to generate the low resolution reconstructed image 52 for the time interval undergoing ROI identification. However, in the approach of FIG. 3, an image segmentor 70 segments the low resolution reconstructed image 52 in accordance with an anatomical model 72 to identify one or more, and typically a plurality, of ROI 74. For example, FIG. 4 diagrammatically illustrates components of an anatomical model comprising a seventeen-component deformable mesh model 72 of a four-chambered heart such as a human or other mammilian heart. The illustrative deformable mesh model 72 diagrammatically depicted in FIG. 4 includes the following segments: basal anterior segment $S_1$; basal anteroseptal segment $S_2$; basal inferoseptal segment $S_3$; basal inferior segment $S_4$; basal inferolateral segment $S_5$; basal anterolateral segment $S_6$; mid anterior segment $S_7$; mid anteroseptal segment $S_8$; mid inferoseptal segment $S_9$; mid inferior segment $S_{10}$; mid inferolateral segment $S_{11}$; mid anterolateral segment $S_{12}$; apical anterior segment $S_{13}$; apical septal segment $S_{14}$; apical inferior segment $S_{15}$; apical lateral segment $S_{16}$; and apex segment $S_{17}$. The components of the deformable mesh model 72 are suitably adjusted using iterative deformable mesh fitting techniques to match corresponding cardiac regions represented in the low resolution reconstructed image 52. Each model component can then represent a ROI, or certain groups of model components that are known to move together can be aggregated to represent a ROI (or, the deformable mesh model 72 can be simplified by aggregating together components that move together so as to formulate a simplified deformable mesh model with fewer than the illustrative seventeen components).

For embodiments of the ROI identification module 22, such as that illustrated in FIG. 3, which output plural ROI for each time interval, a ROI selector RIS selects each ROI in turn for input to the positional characteristic determination module 24, so as to determine a positional characteristic for each of the plural ROI.

To accommodate individual variations, in some embodiments the deformable mesh model 72 is a subject-specific model generated for the specific subject undergoing radiological imaging. For example, an imaging technique such as CT or MR can be used to generate high-resolution cardiac images at different phases of the cardiac cycling, and the deformable mesh model 72 is made subject-specific by fitting a generic cardiac segmentation mesh to these high resolution CT or MR images. The subject-specific model 72 allows the definition of segments of the heart to be tracked locally and can be used for consistency checks on the tracked elements as well as landmark motion profiles. Alternatively the deformable mesh model 72 may be adapted to each cycle of a gated acquisition (for example, gated based on an electrocardiograph signal) so as to allow direct extraction of motion profiles from the sequence of models in the different gating states. The deformable mesh model 72 contains rigid and non-rigid motion information to facilitate local motion compensation for one or plural ROI in a data driven mode. That is, the events are corrected depending on the corresponding defined region or segment of interest in which they lie and corresponding to the motion phase when they were generated.

In the illustrative embodiment of FIGS. 3 and 4 each ROI is determined based on deformation of a corresponding model component (or corresponding aggregation of model components). Accordingly, in this illustrative embodiment the positional characteristic of each ROI is optionally determined from the deformation parameters employed to fit the corresponding model component or components of the deformable mesh model 72 to the ROI. Thus, for example, if the fitted deformation parameters translate the model component corresponding to a ROI so as to fit that ROI, then the positional characteristic for that ROI is suitably the model component translation indicated by the fitted deformation parameters. Thus, for such an embodiment the positional characteristic determination module 24 optionally operates on the fitted parameters of the deformation model 72, rather than operating on the low resolution reconstructed image 52 as in the illustrative embodiment of FIG. 2. In yet another variant embodiment, the positional characteristic for each ROI is pre-calculated based on fitting the deformable mesh model 72 to the calibration CT or MR images. In this case, the deformable mesh model 72 is applied only by the ROI identification module 22 to identify the ROI as illustrated in FIG. 3; thereafter, the positional characteristic for each ROI is assigned by the positional characteristic determination module 24 based on a lookup table providing positional characteristic versus ROI/cardiac phase data.

For embodiments in which the local motion is expected to be principally due to cardiac or respiratory cycling or another periodic, quasi-periodic, or repetitive motion, it may be advantageous to define a time interval as an aggregation of two or more temporally non-contiguous time sub-intervals having a common phase of the cardiac, respiratory, or other repetitive cycling. For example, in the illustrative embodiment of FIGS. 3 and 4, using such aggregated time intervals provides more LOR's per time interval which may enable more accurate low resolution image reconstruction and consequently more accurate fitting of the deformable mesh model 72.

Figure 5:
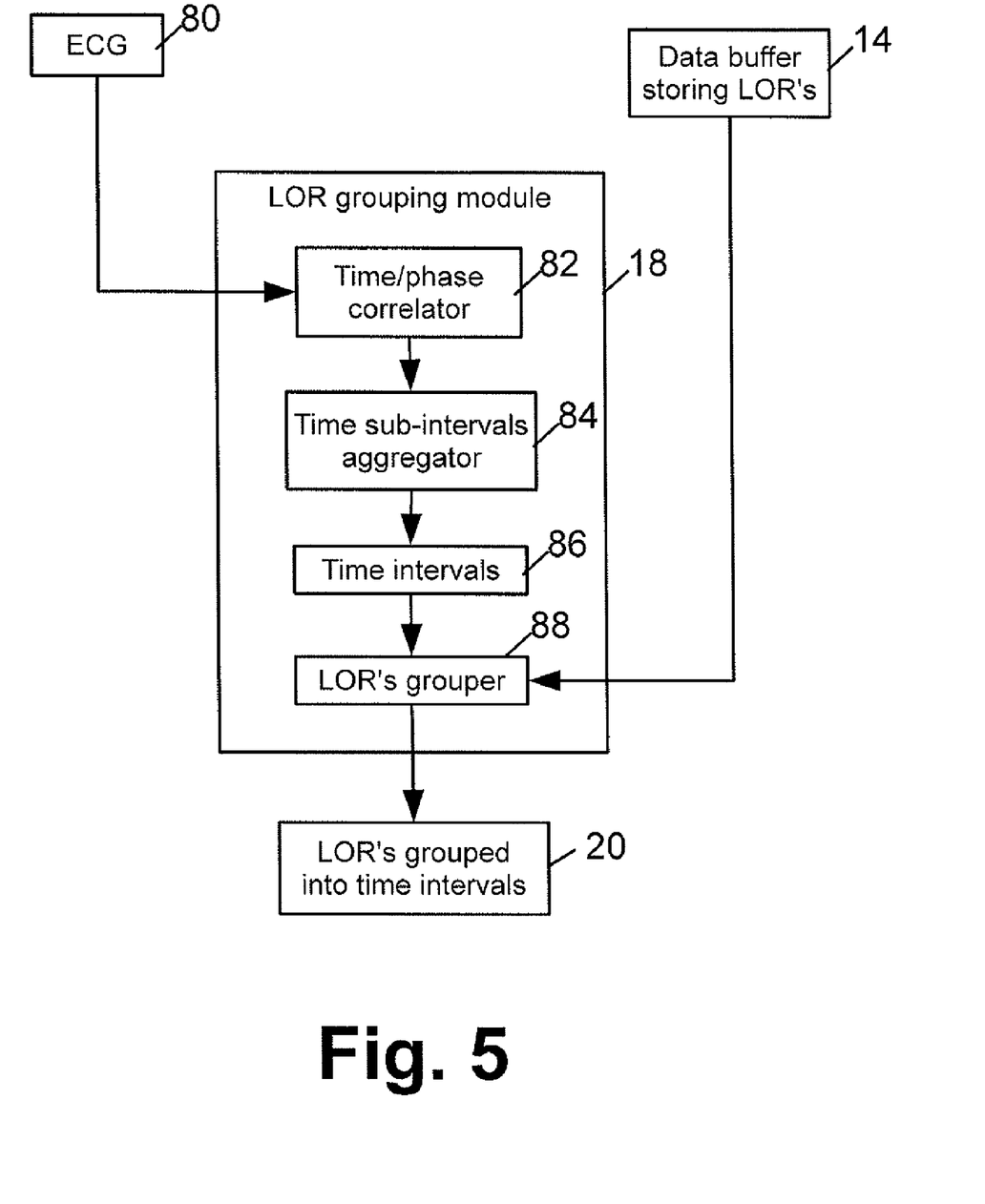
FIG. 5 diagrammatically shows an illustrative embodiment of the LOR grouping module of the system of FIG. 1, which enables aggregation of time sub-intervals having a common phase.

With continuing reference to FIG. 1 and with further reference to FIG. 5, an illustrative embodiment of the LOR grouping module 18 is shown which aggregates temporally non-contiguous time sub-intervals having a common phase. The illustrative embodiment of FIG. 5 operates based on an electrocardiograph (ECG) 80 which provides a signal indicative of cardiac cycling; it is straightforward to replace this monitor with a respiratory monitor so as to facilitate aggregation of time sub-intervals having a common respiratory phase. A time/phase correlator 82 correlates time sub-intervals with cardiac phase based on the cardiac cycling information provided by the ECG 80. A time sub-intervals aggregator 84 then aggregates time sub-intervals having a common phase to define time intervals 86 as aggregations of time sub-intervals having common cardiac phase. A LOR's grouper 88 then groups LOR's stored in the data buffer 14 based on temporal information stored with the LOR's to generate LOR's grouped into time intervals 20 in which each time interval (or at least one of the time intervals) is an aggregation of temporally non-contiguous time sub-intervals having a common phase.

Figure 6:
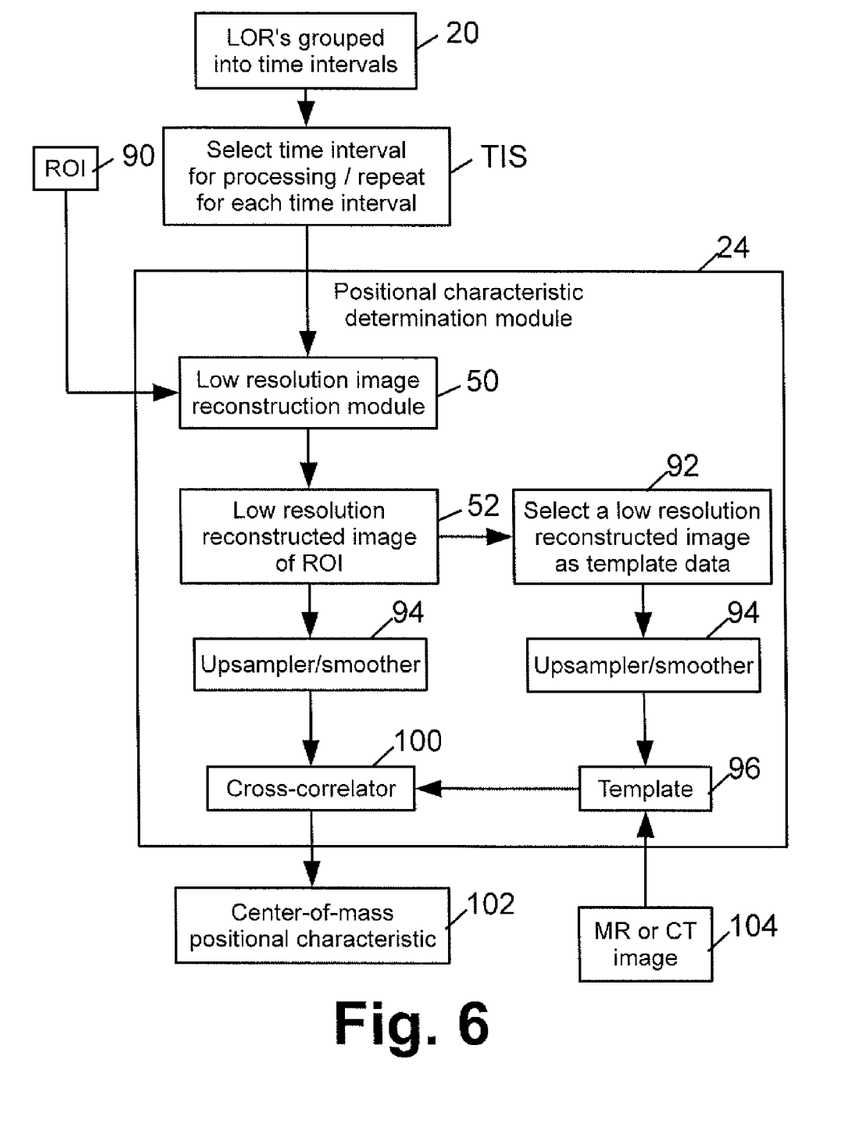
FIG. 6 diagrammatically shows an illustrative embodiment of the positional characteristic determination module of the system of FIG. 1, which employs cross-correlation in determining a center-of-mass positional characteristic.

With continuing reference to FIG. 1 and with further reference to FIG. 6, an illustrative embodiment of the positional characteristic determination module 24 is described, in which the positional characteristic is determined as a center of mass by cross-correlating a low-resolution reconstructed image and a template. This illustrative embodiment employs the time interval selector TIS to select successive time intervals for processing, so as to apply the positional characteristic determination module 24 on a per-time interval basis. If plural ROI are identified for each time interval, then the ROI selector RIS is also used to select a ROI for processing (see, e.g. FIG. 3). The positional characteristic determination module 24 also receives as input a ROI 90, which is either a fixed ROI or a time interval-specific ROI identified by the ROI identification module 22 for the time interval under processing. The illustrative positional characteristic determination module 24 applies the low resolution image reconstruction module 50 to generate the low resolution reconstructed image 52 of the ROI, as already described.

Applying cross-correlation entails generating or identifying a suitable template. In the illustrative embodiment of FIG. 6, a suitable template is generated from the low resolution reconstructed image 52 of the ROI of a selected one of the time intervals. A selector 92 selects one of the low resolution reconstructed images corresponding to the time intervals as template data. The selection can use any suitable selection criterion, such as an image quality criterion, or a quiescence criterion such as selecting a time interval corresponding to a cardiac phase at which the heart is substantially at rest, or so forth. Insofar as the selected template data is a low resolution image reconstruction generated from a relatively small number of LOR's, the template data is likely to be relatively noisy. Accordingly, noise reducing processing is optionally performed on the template data to define the template. In the illustrative embodiment, noise reduction is provided by an upsampler/smoother 94 so as to produce a suitably smoothed template 96 for cross-correlation.

A cross-correlator 100 performs cross-correlation between the low resolution reconstructed image 52 and the template 96. Optionally, the upsampler/smoother 94 is also applied to the low resolution reconstructed image 52 before applying the cross-correlator 100 so as to reduce noise. The cross-correlator 100 performs cross-correlation as follows (for two-dimensional data):

$$c(x, y) = \sum_{i=-I}^{I} \sum_{j=-J}^{J} f(i, j)g(x-i, y-j), \quad (1)$$

or as follows (for three-dimensional data):

$$c(x, y, z) = \sum_{i=-I}^{I} \sum_{j=-J}^{J} \sum_{k=-K}^{K} f(i, j, k)g(x-i, y-j, z-k). \quad (2)$$

In Equations (1) and (2), the function $f$ represents the template 96 after upsampling/smoothing, the function g represents the low resolution reconstructed image 52 after upsampling/smoothing, and (I,J) represents the dimensions of the two-dimensional image or (I,J,K) represents the dimensions of the three-dimensional image. The positional coordinates of maximum cross-correlation, i.e. $(x,y)|_{max\{c(x,y)\}}$ or $(x,y,z)|_{max\{c(x,y,z)\}}$, suitably represents a center-of-mass positional characteristic 102. Rather than taking the pixel or voxel for which the cross-correlation is maximum, the center-of-mass positional characteristic 102 can instead be defined as the center of a nine-pixel or twenty-seven voxel region of maximum average cross-correlation value, which may reduce noise sensitivity.

In a suitable embodiment, the upsampler/smoother 94 employs a Gaussian filter or nearest-neighbour or trilinear interpolation to perform the smoothing. Upsampling is performed to overcome the restriction of the cross-correlation method to work on a finite grid (given by the pixels or voxels of the image) which has as a consequence that the accuracy of the centre of mass estimation is limited by the pixel or voxel dimensions.

Instead of deriving the template 96 from a selected low resolution image, the template 96 can be derived from another source, such as from a CT or MR image of the ROI 104. If anatomical information from another imaging modality such as CT or MR is used, the template 96 can be defined based on this information. Due to the high spatial resolution of the CT or MR modality, an accurate template can be generated. Moreover, the CT or MR anatomical image 104 can be acquired quickly, so as to minimize motion artifacts. For example, a typical breath cycle is 5 s, whereas a chest CT scan can be acquired in less than one second. As another option, the template 96 can be generated based on a priori knowledge. For example, if it is expected that a lesion of interest is likely to be generally spherical in shape and of a certain expected size, then the template 96 can be generated as a circular or spherical feature. An iterative approach can also be used to generate the template 96. For example, starting from an initial estimated template, for example an initial sphere of initial radius r, the center-of-mass positional characteristic 102 is estimated in accordance with FIG. 6 and a high resolution motion-compensated image generated in accordance with FIG. 1. The high resolution motion-compensated image is used to generate improve the template 96, and so forth iteratively until a change in the template from one iteration to the next is smaller than a stopping threshold.

Figure 7:
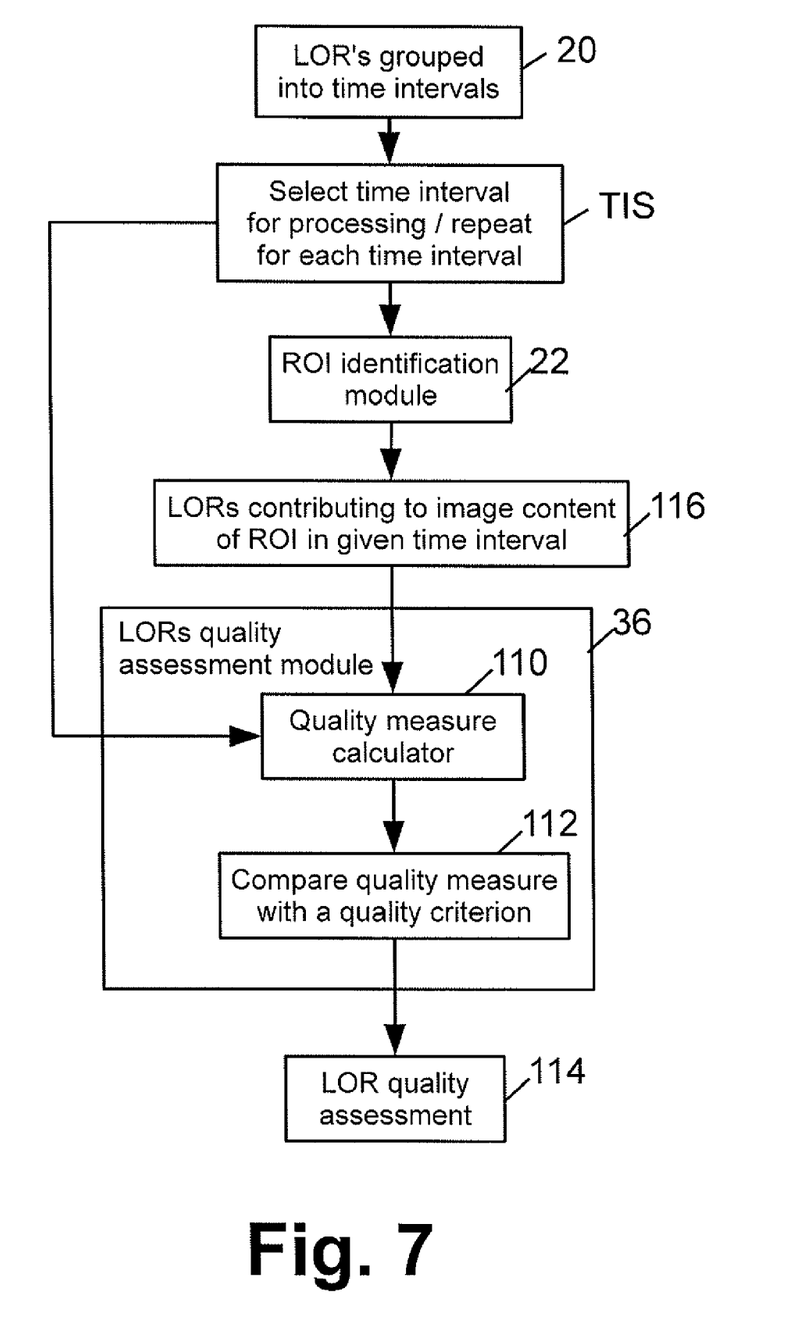
FIG. 7 diagrammatically shows an illustrative embodiment of the LOR's assessment module of the system of FIG. 1.

With continuing reference to FIG. 1 and with further reference to FIG. 7, an illustrative embodiment of the LORs quality assessment module 36 is described. The time interval selector TIS selects one of the time intervals for processing on a per-interval basis. In one illustrative embodiment, the LORs quality assessment module 36 operates on the LOR's of the selected time interval. A quality measure calculator 110 computes a quality measure by counting the number of LOR's grouped into the selected time interval. That is, the quality measure is, in this illustrative embodiment, the number of LOR's grouped into the selected time interval. A comparator 112 compares the quality measure with a quality criterion and outputs a LOR quality assessment 114 based on the comparison. This embodiment of the LORs quality assessment module 36 is based on the expectation that the detection of positron-electron annihilation events (in the case of PET) or of single photons emitted by the radiopharmaceutcal (in the case of SPECT) should be fairly constant with time, and accordingly should satisfy a threshold value. If the count of LOR's is less than the threshold value for a particular time interval, this suggests that some acquisition problem arose during that time interval, and accordingly any results obtained from that time interval, including the positional characteristic, are questionable.

In another illustrative embodiment, the LOR's quality assessment module 36 operates on the set of LOR's that contribute to image content within the ROI, rather than operating on all the LORs in a time interval. The LOR's that contribute to image content within the ROI can be determined in various ways, as already discussed. For example, the criterion for a LOR to contribute to image content within the ROI may be that the LOR intersect or pass through the ROI, or that a minimum length of the LOR overlap the ROI, or for TOF data that have a TOF probability peak within the ROI, or that at least a threshold percentage of the TOF probability distribution lie within the ROI, or so forth. Accordingly, in this illustrative embodiment the LOR's quality assessment module 36 receives the set of LOR's 116 that contribute to image content within the identified ROI, as output by the ROI identification module 22. The quality measure can again be computed by the calculator 110, but in this embodiment only those LOR's 116 which contribute to image content within the ROI are counted. The result is compared against a threshold quality criterion by the comparator 112 to generate the LOR quality assessment 114. This embodiment of the LORs quality assessment module 36 is also based on the expectation that the detection of positron-electron annihilation events (in the case of PET) or of single photons emitted by the radiopharmaceutical (in the case of SPECT) should be fairly constant with time, but also incorporates the further expectation that the number of LOR's contributing to image content of the ROI should also be fairly constant with time. If the count of LOR's contributing to image content of the ROI is less than a threshold value for a particular time interval, this suggests that either some acquisition problem arose during that time interval, or that the identified ROI is in substantial error (for example, not encompassing a lesion of interest that has the highest radiopharmaceutical concentration). Accordingly, the positional characteristic obtained for that time interval is questionable.

Although a threshold quality criterion is described, other quality criteria can also be employed. For example, an average rate of LOR acquisition can be computed throughout the acquisition period, and the quality criterion can assess whether the average rate of LOR acquisition during any given time interval deviates by more than a threshold percentage from the average rate of LOR acquisition throughout the acquisition period. Again, a substantial deviation is indicative of an acquisition problem or, in the case of the second embodiment, is possibly indicative of the lesion or other feature of interest moving outside of the ROI. In either case, the computed positional characteristic is questionable.

Figure 8:
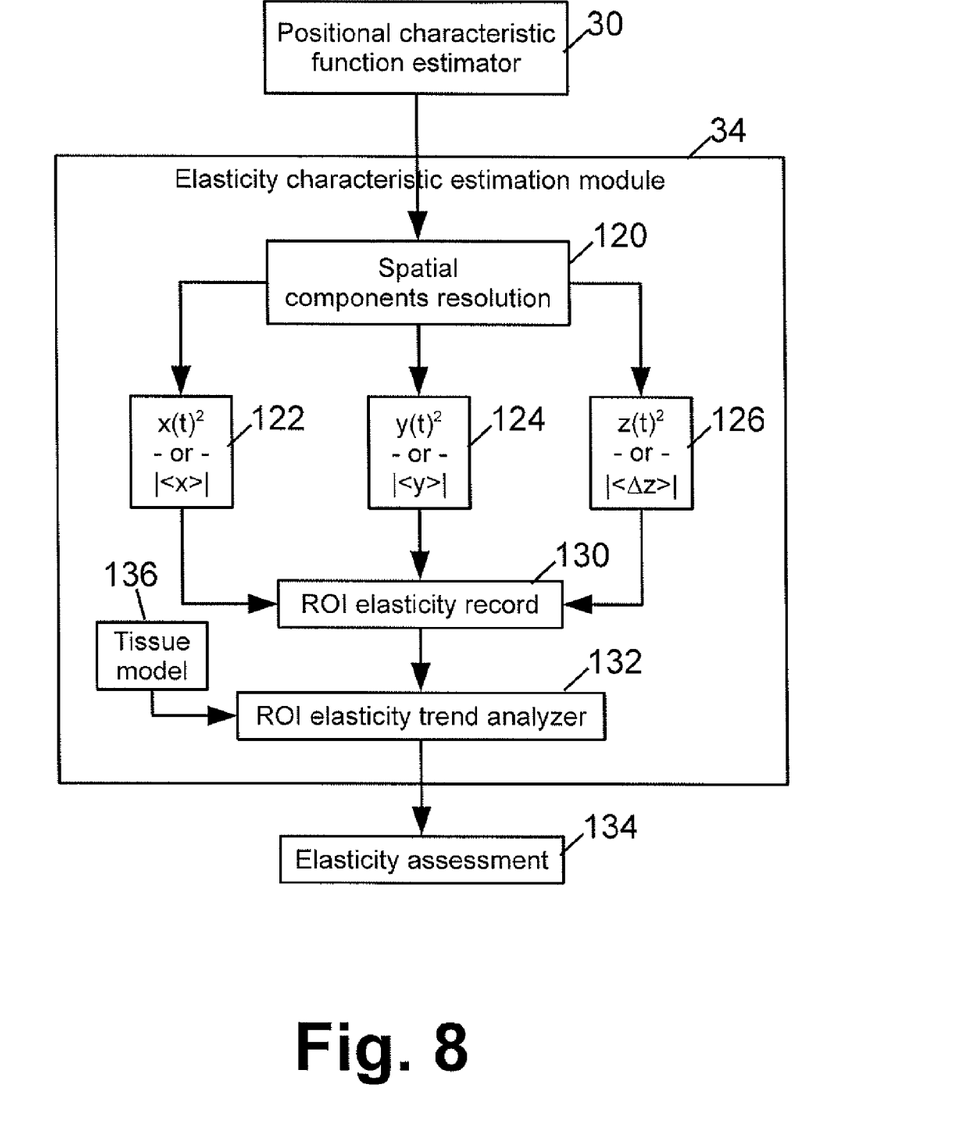
FIG. 8 diagrammatically shows an illustrative embodiment of the elasticity characteristic estimation module of the system of FIG. 1.

With continuing reference to FIG. 1 and with further reference to FIG. 8, an illustrative embodiment of the elasticity characteristic estimation module 34 is described. The elasticity characteristic estimation module 34 receives as input the positional characteristic-time function output by the positional characteristic function estimator 30. It is known that a general relationship exists in that displacement d is proportional to the applied deformational pressure P scaled by an elasticity measure such as the inverse of the stiffness $(1/k)$. This relationship can be expressed, for example, as $d=P/k$ where k denotes the stiffness. As the stiffness k increases, the displacement d generated by a given deformational pressure P decreases. For some diagnostic or clinical applications, information on the displacement vector $\vec{d}$ is of interest. This vector can be written as a function of time as: $\vec{d}(t)=(x(t),y(t),z(t))$. Considering the positional characteristic to be a measure of displacement (a reasonable association for a center-of-mass positional characteristic), one can equate the center-of-mass positional characteristic-time function with the displacement vector $\vec{d}(t)=(x(t),y(t),z(t))$. A suitable average displacement r can be represented in various ways, such as a scalar representation of the form $\langle r \rangle = \langle \sqrt{x(t)^2+y(t)^2+z(t)^2} \rangle$, or a vector representation of the form $\vec{r}=(\langle |x(t)| \rangle, \langle |y(t)| \rangle, \langle |z(t)| \rangle)$. Thus, as shown in FIG. 8 applying these measures entails applying spatial components resolution 120 to generate a term $x(t)^2$ or $\langle |x(t)| \rangle$ 122, a term $y(t)^2$ or $\langle |y(t)| \rangle$ 124, and a term $z(t)^2$ or $\langle |z(t)| \rangle$ 126. These terms can be combined to generate the scalar displacement representation $\langle r \rangle = \langle \sqrt{x(t)^2+y(t)^2+z(t)^2} \rangle$ or the vector representation $\vec{r}=(\langle |x(t)| \rangle, \langle |y(t)| \rangle, \langle |z(t)| \rangle)$. By recording these values over time (for example, over several radiological imaging sessions performed after successive therapy sessions), a ROI elasticity record 130 is generated that tracks the elasticity of tissue surrounding the lesion over time.

The measure $\langle r \rangle$ or the measure $\vec{r}$ is representative of the mobility of the lesion or other feature of interest in the ROI. These measures can be applied, for example, in follow-up studies for therapy monitoring, to determine whether elasticity of the tissue surrounding the lesion is increasing or decreasing. Successive $\langle r \rangle$ or $\vec{r}$ values can be subtracted or otherwise recorded to generate the elasticity record 130, and a ROI elasticity trend analyzer 132 analyzes trends in these values over time to generate an elasticity assessment 134. For example, a reduction of the measure $\langle r \rangle$ or the measure $\vec{r}$ over time can indicate reduced elasticity of the lesion-bearing tissue. The degree of reduction is related to the degree of loss of elasticity.

As another option, the average displacement can be represented as an input to a tissue model 136. This method of evaluating the displacement of the lesion is a more quantitative analysis of the deformation process. The tissue model 136 may, for example, be a subject-specific model of the organ of interest that can be generated based on CT or MR images. Optionally, CT or MR images are acquired under ultrasonic excitation to generate dynamic images, in which case a model of the tissue movement can be generated. Information about local changes in the tissue movement during therapy derived from PET, SPECT, or other radiological imaging using the elasticity characteristic estimation module 34 can be used to adjust the tissue model 136, for example as suitably represented by a stiffness matrix $\overline{\overline{K}}$. This adjustment results in an estimate of changes in the $\overline{\overline{k}}$-value matrix $\overline{\overline{K}}$ representing changes in the stiffness. Changes in the elasticity matrix $\overline{\overline{K}}$ is a quantitative measure for tissue alterations.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A radiological imaging method comprising:
   acquiring radiological lines of response (LOR's) from a subject;
   grouping the acquired LOR's into time intervals such that the LOR's of a group of LOR's were acquired during a selected time interval;
   for at least some time intervals, identifying a region of interest for the time interval based on LOR's grouped into the time interval, determining a positional characteristic of the region of interest identified for the time interval based on LOR's grouped into the time interval, and spatially adjusting LOR's grouped into the time interval based on the positional characteristic of the region of interest identified for the time interval; and
   reconstructing at least the spatially adjusted LOR's to generate a motion-compensated reconstructed image.

2. The radiological imaging method as set forth in claim 1, wherein the identifying of a region of interest for a time interval based on LOR's grouped into the time interval comprises:
   estimating an estimated positional characteristic for the time interval; and
   identifying the region of interest for the time interval as a nominal region of interest adjusted based on the estimated positional characteristic for the time interval.

3. The radiological imaging method as set forth in claim 2, wherein the estimating of an estimated positional characteristic for a time interval comprises at least one of:
   estimating the estimated positional characteristic for the time interval based on a reading of a motion sensor acquired during the time interval, and
   estimating the estimated positional characteristic for the time interval based on a motion model.

4. The radiological imaging method as set forth in claim 2, wherein the estimating of an estimated positional characteristic for a time interval comprises:
   estimating an estimated positional characteristic for the time interval based on the positional characteristic determined for at least one other of the time intervals.

5. The radiological imaging method as set forth in claim 1, wherein the identifying of a region of interest for a time interval based on LOR's grouped into the time interval comprises:
   generating a low-resolution reconstructed image corresponding to the LOR's grouped into the time interval; and
   identifying the region of interest for the time interval based on the low-resolution reconstructed image corresponding to the LOR's grouped into the time interval.

6. The radiological imaging method as set forth in claim 5, wherein the determining of a positional characteristic comprises:
   determining the positional characteristic as a center of mass determined by cross-correlating the low-resolution reconstructed image and a template.

7. The radiological imaging method as set forth in claim 5, wherein the generating of the low-resolution reconstructed images, the identifying of the regions of interest, and the spatial adjusting of the LOR's are repeated to iteratively improve the spatial adjusting of the LOR's.

8. The radiological imaging method as set forth in claim 1, wherein the identifying of a region of interest for a time interval based on LOR's grouped into the time interval comprises:
   generating a low-resolution reconstructed image corresponding to the LOR's grouped into the time interval; and
   segmenting the low-resolution reconstructed images to identify at least one region of interest for the time interval.

9. The radiological imaging method as set forth in claim 8, wherein the segmenting identifies a plurality of regions of interest for the time interval, and the determining of a positional characteristic and the spatial adjusting of LOR's is performed for each of the plurality of regions of interest in the time interval.

10. The radiological imaging method as set forth in claim 1, wherein the grouping of the acquired LOR's into time intervals comprises:
    defining at least one of the time intervals as an aggregation of two or more temporally non-contiguous time sub-intervals having a common cardiac or respiratory phase.

11. The radiological imaging method as set forth in claim 1, further comprising:
    assessing a quality of LOR's grouped into at least some time intervals.

12. The radiological imaging method as set forth in claim 11, wherein the assessing comprises one of:

comparing a total number of LOR's grouped into a time interval that pass through the region of interest for the time interval with a quantity criterion, and comparing a quantity criterion with a total number of LOR's grouped into a time interval that have TOF probability peaks within the region of interest for the time interval.

13. The radiological imaging method as set forth in claim 1, further comprising:

estimating an elasticity characteristic of the region of interest based on a positional characteristic versus time representation derived from the positional characteristics of the time intervals.

14. The radiological imaging method as set forth in claim 1, further comprising:

displaying or storing the motion-compensated reconstructed image.

15. A radiological imaging method comprising:

acquiring radiological lines of response (LOR's) from a subject;

grouping the acquired LOR's into time intervals such that the LOR's of a group of LOR's were acquired during a selected time interval;

for at least some time intervals, determining a positional characteristic of a region of interest based on LOR's grouped into the time interval, and spatially adjusting LOR's grouped into the time interval based on the positional characteristic identified for the time interval;

reconstructing at least the spatially adjusted LOR's to generate a motion-compensated reconstructed image; and assessing the positional characteristics determined for the time intervals.

16. The radiological imaging method as set forth in claim 15, wherein the assessing comprises:

assessing a quality of LOR's grouped into a time interval.

17. The radiological imaging method as set forth in claim 16, wherein the assessing of the quality of LOR's grouped into a time interval comprises:

comparing a total number of LOR's grouped into the time interval that pass through the region of interest for the time interval with a quantity criterion.

18. The radiological imaging method as set forth in claim 16, wherein the LOR's are time-of-flight (TOF) LOR's, and the assessing of the quality of LOR's grouped into a time interval comprises:

comparing a quantity criterion with a total number of TOF LOR's grouped into the time interval that have TOF peaks within through the region of interest for the time interval.

19. The radiological imaging method as set forth in claim 15, wherein the assessing comprises:

estimating an elasticity characteristic of the region of interest based on a positional characteristic versus time representation derived from the positional characteristics of the time intervals.

20. A radiological imaging method comprising:

acquiring radiological lines of response (LOR's) from a subject;

grouping the acquired LOR's into time intervals such that the LOR's of a group of LOR's were acquired during a selected time interval;

for at least some time intervals:

generating a low-resolution reconstructed image of a region of interest from the LOR's grouped into the time interval, determining a center of mass positional characteristic by cross-correlating the low-resolution reconstructed image and a template, and spatially adjusting LOR's grouped into the time interval based on the positional characteristic; and reconstructing at least the spatially adjusted LOR's to generate a motion-compensated reconstructed image.

21. The radiological imaging method as set forth in claim 20, further comprising:

selecting one of the low-resolution reconstructed images corresponding to the time intervals as template data; and performing noise-reducing processing on the template data to define the template.

22. The radiological imaging method as set forth in claim 20, further comprising:

generating the template based on a priori anatomical knowledge.

23. The radiological imaging method as set forth in claim 22, further comprising:

obtaining the a priori anatomical knowledge from the subject using an imaging modality other than an imaging modality used to acquire LOR's from a subject.

24. A radiological imaging method comprising:

acquiring radiological lines of response (LOR's) from a subject;

grouping the acquired LOR's into time intervals such that the LOR's of a group of LOR's were acquired during a selected time interval;

for at least some time intervals:

generating a low-resolution reconstructed image of a region of interest from the LOR's grouped into the time interval, segmenting the low-resolution reconstructed image to define a plurality of regions of interest, determining a positional characteristic for the region of interest, and spatially adjusting LOR's grouped into the time interval based on the determined positional characteristics; and reconstructing at least the spatially adjusted LOR's to generate a motion-compensated reconstructed image.

25. The radiological imaging method as set forth in claim 24, wherein the LOR's are time-of-flight LOR's (TOF-LOR's), and the segmenting is based on a deformable mesh cardiac model and defines regions of interest corresponding to cardiac anatomical features, and the grouping comprises:

grouping the acquired LOR's into time intervals such that each group of LOR's was acquired during a selected time interval, wherein each time interval comprises a plurality of temporally non-contiguous time sub-intervals having a common cardiac phase.

* * * * *